May 25, 1937.    B. W. MACY    2,081,243
APPARATUS FOR PASTEURIZING LIQUIDS
Filed Sept. 8, 1933    2 Sheets-Sheet 2
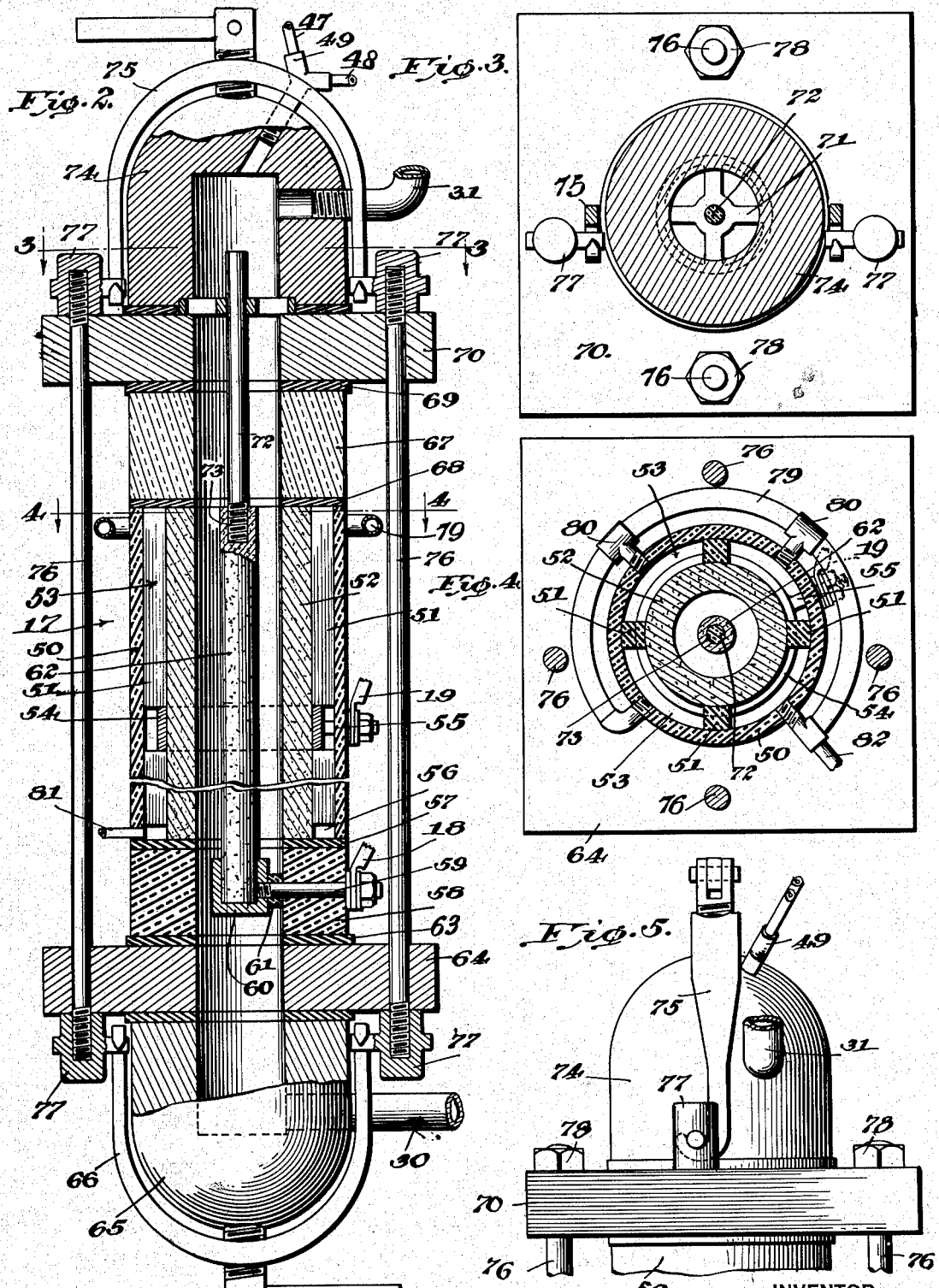

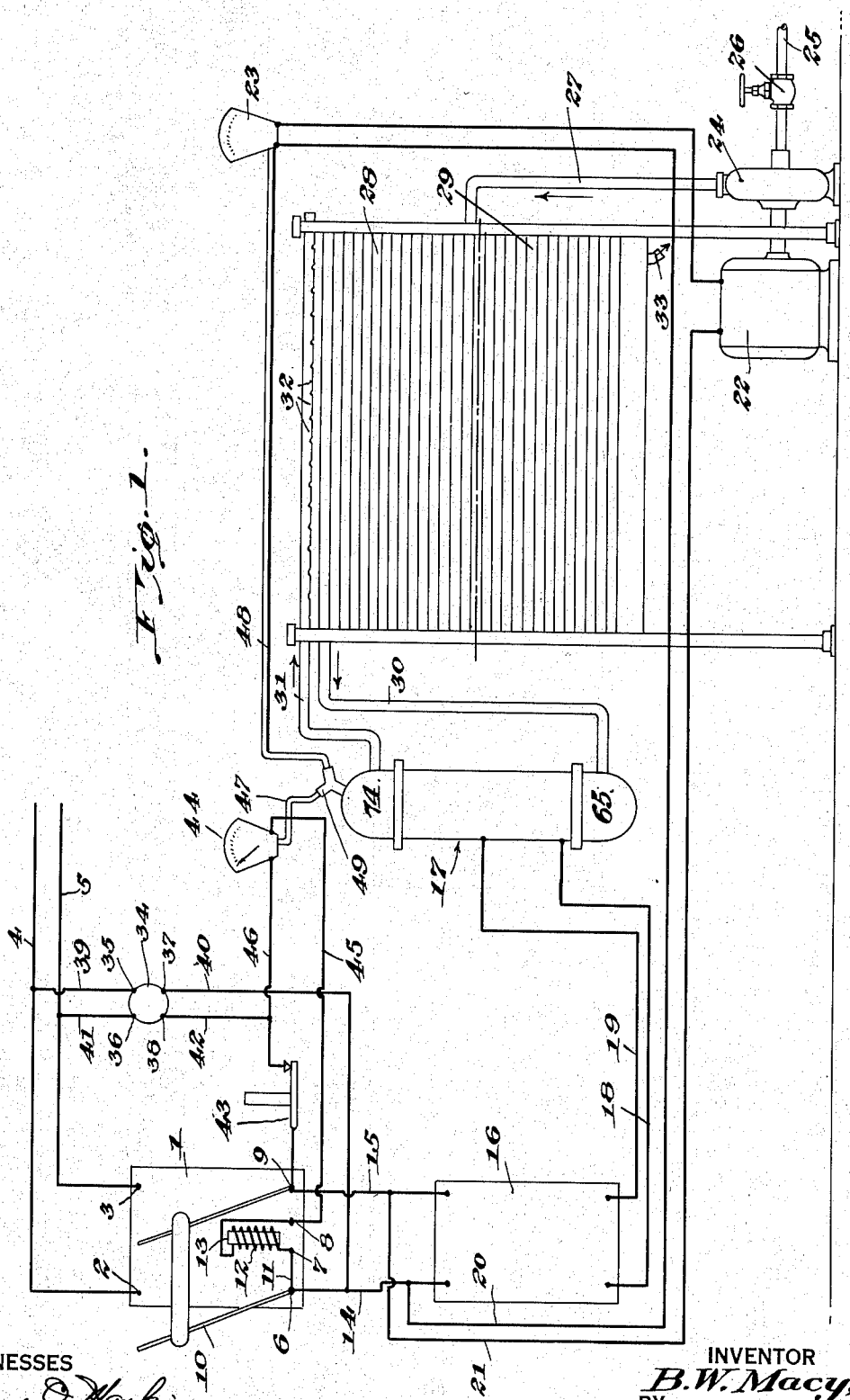

Patented May 25, 1937

2,081,243

UNITED STATES PATENT OFFICE 2,081,243

APPARATUS FOR PASTEURIZING LIQUIDS

Barnett W. Macy, Jacksonville, Fla.

Application September 8, 1933, Serial No. 688,683

3 Claims. (Cl. 204—24)

This invention relates to the pasteurization of liquids, and its objects are as follows:—

First, to subject the liquid to an alternating electrical current which is interrupted at such a rate which it has been determined is destructive of a great percentage of bacterial life.

Second, to produce the foregoing interruptions by a magnetic or other switch, said interruptions literally exploding the bacteria without having any detrimental effect on the liquid.

Third, to pasteurize liquids according to the herein disclosed process which does not depend on heat for the destruction of the bacteria.

Fourth, to provide a pasteurizing apparatus including an electrolytic unit in which the central and outer electrodes are so mounted with respect to the inlet dome that the liquid is not subjected to the electrical pulsations until well on its course through the unit.

Fifth, to supplement the pasteurizing apparatus with an electrical interrupter the sole function of which is to deliver the current to the electrical unit in relatively slow and intense impulses or jolts, the periodic rate of the impulses being variable by adjustment of the interrupter.

Other objects and advantages will appear in the following specification, reference being had to the accompanying drawings in which, Figure 1 is a diagram illustrating the means by which the process is carried out.

Figure 2 is a central vertical section of the electrolytic unit which is one of the important features of the apparatus, parts being shown in elevation.

Figure 3 is a cross section taken on the line 3—3 of Figure 2.

Figure 4 is a cross section taken on the line 4—4 of Figure 2.

Figure 5 is a detail side elevation of the outlet dome, the view being taken at 90° from the position in Figure 2.

Some of the most recent developments in the treatment of milk since the germ theory came to be generally known, are based on the action of an electrical current the primary purpose of which is to heat the milk to a temperature of approximately 150° F. and then cool it to a suitable storage temperature. It has been discovered by actual experimentation that unless the temperature is raised to a sufficiently high point the heating of the milk simply has the effect of suspending the animation of an undesirably high percentage of the bacteria, and that when this bacteria goes onto a cooler place it comes to life, so to speak, with the treated milk in a condition not so very much better than it was originally.

This fact has been recognized but not remedied to any degree of satisfaction. If the milk is carried to a too high temperature in order to insure killing the bacteria the milk takes on a scorched taste with a destruction of the cream line. In order to play safe, milk treating establishments will stay on the side of lower temperatures. This avoids the last two effects, but the bacterial count per cubic centimeter is far higher than it should be as already pointed out.

The instant process is based on projecting rapid surges or impulses of alternating electrical current across the milk course so as to electrocute the bacteria solely by the interruptions of the current and not by such heat as it may cause. Attention is directed to Figure 1. A main switch 1 has contacts 2, 3 to which the main line wires 4, 5 are connected. The switch also includes four terminals 6, 7, 8, 9.

The terminals 6, 9 are the pivots of a double bladed switch member 10. The terminals 6, 7 are connected by a bus 11. The terminals 7, 8 have the opposite ends of the winding 12 of a solenoid connected to them, the movable core 13 of which has any suitable connection (not shown) with the switch member 10 so that a drawing in of the core upon energization of the solenoid will move the switch member into engagement with the contacts 2, 3 in a circuit-closing position.

Wires 14, 15 connect the terminals 6, 9 with an interrupter 16. The details of this are purposely omitted because any one of a variety of types of interrupters can be employed. It comprises a current-interrupting switch, magnetic or otherwise, which interrupts the current at the rate of 200 or more times per minute. The interrupter is connected with an electrolytic pasteurizing unit 17 by means of wires 18, 19.

Wires 20, 21, are connected across the wires 14, 15 at one end. The wire 21 has a motor 22 connected in series with it. Thereafter both wires lead to a compensating resistance diagrammatically indicated 23. The motor drives a pump 24 which draws the milk from a source of supply through a pipe 25 which has a valve 26 in it. The pump has an outlet pipe 27 which delivers the milk to the bottom end of a regenerative cooler 28.

The regenerative cooler and also the refrigerating cooler 29 beneath it are of known types, the former having a discharge pipe 30 which leads to the unit 17. After the milk goes through said unit it leaves at an outlet pipe 31. That part of this pipe situated over the cooler 28 is perforated at 32. As the milk flows over the coils of the cooler 28 there is an exchange of heat, and when the milk reaches the cooler 29 it is reduced to a storage temperature before flowing to the bottling machine by way of the outlet 33.

A starter button 34 is connected in parallel across the line wires 4, 5. This button is a double pole switch which includes contacts 35, 36, 37, and 38. A wire 39 connects the main line wire 4 to the contact 35. A wire 40 connects the contact 37 with the wire 14. A wire 41 connects contact 36 with the main line wire 5. A wire 42 connects contact 38 with the main switch terminal 9, this wire having a normally closed safety switch 43 in it.

The switch 43 is adapted for manual operation, and its purpose is to de-energize the solenoid 12 for the throwing of the switch member 10 to an open position. The same result is obtained automatically by a thermometer 44. This is an electrical thermometer of a known type. It is connected across the terminals 8, 9 by a wire 45 and a wire 46 which is connected onto the wire 42 and so controls a holding circuit.

The temperature of the milk in the upper end of the unit 17 is transmitted to the thermometer 44 through a suitable form of manometer tube 47. The compensating resistance 23 is operated by milk pressure in the upper end of the unit 17 also through a suitable type of manometer tube 48. These tubes are attached to a fitting 49 which, in practice, will be internally equipped for temperature-pressure responses.

The operation of the process is as follows: Consider the main switch 1 as being open as shown. Press the starter button 34. A current flow from an alternating source of current is traced over the wire 4, wire 39, contacts 35, 37, wire 40 to terminal 6, bus 11, terminal 7, winding 12, terminal 8, wire 45, through thermometer 44, wires 46 and 42, contacts 38, 36, wire 41 to main wire 5 and again to said source of current.

The energization of the solenoid operates the core 13 and its connections to the switch member 10 to throw the latter against the contacts 2, 3 in the circuit-closing position. Current then flows as follows, the starter button 34 having been released in the meantime: from the current source over wire 4, contact 2, terminal 6, wire 14 through one side of the interrupter 16, wire 18 to the unit 17, wire 19, to the other side of the interrupter 16, wire 15, terminal 9, contact 3 and over wire 5 back to the source of current. Current is supplied the motor 22 at the same time by way of wires 20, 21 and the compensating resistance 23. Milk is being pumped through the regenerative cooler 28. Milk has been given merely as an instance of one liquid which is adapted to be treated. The process is intended to handle liquids other than milk. The milk flows through the unit 17, and as it flows through it is subjected to an electrical current which is interrupted by the interrupter 16 at a frequency of 200 or more interruptions per minute. This is a relatively slow rate of interruption, and its effect is to subject the bacteria to intense impulses or jolts which are all the more severe because of their being slow. It has been found that milk having a bacterial count of 370,000 per cubic centimeter at the input of the unit 17 has been pasteurized to approximately 2,000 per cubic centimeter at the output.

Should the temperature of the milk at the output side of the unit 17 become undesirably high, the thermometer 44 will break the holding circuit through the solenoid 12 and cause the latter to move the switch member 10 to the circuit-opening position. Should the thermometer fail, the same effect is obtainable manually by pressing the safety switch 43. It is undesirable to thus interrupt the continuous operation of the process. Such an interruption is normally prevented by the compensating resistance 23.

When the temperature of the milk reaches a high point, but not high enough to cause the automatic operation of the thermometer 44, the resistance 23 will be automatically operated to speed up the motor 22 and so cool the milk by pumping more through. Should the temperature drop toward an undesirable low point the compensating resistance 23 will slow up the motor 22 and so slow the flow through the unit 17, enabling the milk to reach a satisfactory working temperature.

It has been stated that the current used in the electrolytic unit must be alternating electrical current. This is necessary because it has been discovered that the use of direct current will separate the butter fat from the milk. Obviously this is undesirable. In subjecting the milk to the electrical impulses, the rate per minute will be regulated to be in proportion to the rate of flow of the milk through the electrolytic unit.

If the rate of flow is increased the number of interruptions per minute will be increased. Conversely, if the rate of flow is diminished the number of interruptions per minute will be decreased. To this end the interrupter 16 is made adjustable in practice. The effect of the foregoing adjustment is to maintain a substantially uniform number of electrical impulses per minute per unit volume of milk.

This principle applies to the pasteurization of milk. The majority of bacteria will be killed, but not all. The interrupter 16 is adapted to be speeded up to cause a sterilization of the milk. This simply means interrupting the alternating electrical current at such a high rate per minute and consequently subjecting the milk to so many impulses per minute that the bacterial life will be eliminated entirely. This will produce absolutely sterile liquid, whether it be milk, as in the example given, or other liquid.

Attention is next directed to the details of the unit 17 (Fig. 2). This comprises a non-metallic cylinder or water jacket 50 preferably of material commonly known as bakelite. It may consist of any other insulating material. Inside of it are spacing means 51 (Fig. 4) which space a non-metallic cylinder 52 of electrical conductive material from the cylinder 50 so as to produce channels 53 (Fig. 4) for the passage of water.

A copper or other conducting band 54 is secured to the outside of the cylinder 52 by shrinking or otherwise. This has a terminal 55 to which the wire 19 (Fig. 1) is connected. The spacing means 51, in the form of cross sectionally non-circular rods of insulating material are separated at the band 54. This is merely for simplification in construction. The lower ends of the rod are spaced from the bottom of the cylinders 50, 52 to provide a bottom space 56.

The cylinders 50, 52 rest on a gasket 57. This rests on a collar 58 of insulating material. This collar carries a terminal 59 to the outer end of which the wire 18 (Fig. 1) is connected. The inner end of it has a cup 60 attached to it. A spacer 61 centers the cup in the bore of the collar 58.

The cup contains the lower end of a non-metallic but electrical conductive rod 62. The rod 62 and cylinder 52 are herein known as the central and outer electrodes.

The collar 58 rests on a gasket 63. This rests on a head 64. This head has an inlet dome 65 beneath it. It is to this dome that the discharge pipe 30 (Fig. 1) is connected. This dome is held in place by clamping means 66.

Near the upper end of the unit there is a collar 67. This is preferably of glass so that the milk can be inspected as it flows through the unit. It is situated between gaskets 68, 69, the first resting on top of the cylinder 50, 52, the latter contacting a head 70 in confronting relationship to the head 64.

The bore of this head is crossed by a spider 71. The spider provides a guide for an insulating rod 72 which is screwed into the upper end of the central electrode 62 as at 73. The spider holds the rod 72 loosely. The rod extends above the spider into the dome, and when the dome is detached the extended end of the rod can be taken hold of to lift the central electrode 62 enough to enable swabbing out the interior of the outer electrode. An outlet dome 74, similar to the dome 65 is mounted on the head 70, being secured by clamping means 75. The dome 74 has the outlet pipe 31 connected to it (Fig. 1). It also has the fitting 49 screwed into place as shown.

Spanner bolts 76 connect the confronting heads 64, 70. When these are tightened, the heads are drawn toward each other tightly, compressing the various gaskets and making liquid tight connections at the joints. The tightening means of the bolts include lugs 77 which form part of the clamping means, and nuts 78 (Fig. 3).

Water for cooling purposes is supplied the channel 53 (Fig. 4) by a tubing (preferably rubber) 79, the points of introduction comprising a number of fittings 80. The fittings are directed into each of the channels, the channels being defined by the spacing means 51 as already brought out. Water is conducted off from the bottom space 56 (Fig. 2) by a discharge pipe 81. One of the fittings of the tubing 79 has an inlet pipe 82 connected to it.

The operation of the unit 17 is readily understood. The entire electrode 52 is charged with electrical current. It is insulated from everything else excepting the current of liquid by the collars 58 and 67 at the bottom and top. An entire volume of milk of a length equal to the length of the outer electrode 52 is charged at one time.

The interrupted current flows to the central electrode 62 whence it is conducted off as already understood. The central electrode is longer than the outer electrode. It extends well into the collar 58 which contains the cup 60 to hold it. The cup 60 is a conductor of electricity, but it is purposely situated outside of the outer electrode 52 so that there may be no interference whatsoever with the killing action of the current, nor any obstruction nor diminution of the immediate passageway through which the liquid flows during its electrolytic treatment.

It is to be observed that this passageway is part of a bore of uniform diameter beginning in the bottom inlet dome, continuing through the lower head 64, collar 58 and ending in the outlet dome 74 after being traced through the top collar and upper head 70. This bore provides for the uniform flow of the liquid. There are no offsets in it to act as obstructions.

I claim:—

1. A cylinder of conductive material constituting an outer electrode, the bore of said cylinder providing a liquid passageway, a rod of conductive material axially positioned in the bore constituting a central electrode and having one end extending beyond the end of the cylinder, means for making electrical current connections to the cylinder and rod, said means comprising a band attached to the cylinder and a cup for the reception of the extended end of the rod.

2. An outer cylindrical electrode the bore of which provides a liquid passageway, a spider situated beyond one end of said electrode, a cup situated beyond the other end of the electrode, a central electrode axially positioned in the outer electrode to seat in the cup, and an insulating rod connected to the other end of the central electrode and passing through the spider.

3. An electrolytic unit comprising an outer cylindrical electrode and a central electrode in the bore thereof, insulating collars and heads at the respective ends of the outer electrode, means to draw the heads together and so make tight joints between the heads, collars and outer electrode, said means including lugs and said heads and collars having bores in continuation of the bore of the outer electrode, inlet and outlet domes also having continuing bores, and clamping means holding onto the lugs and pressing on the domes for detachably connecting the domes to the heads.

BARNETT W. MACY.